United States Patent
Green et al.

(10) Patent No.: US 7,299,219 B2
(45) Date of Patent: Nov. 20, 2007

(54) HIGH REFRESH-RATE RETRIEVAL OF FRESHLY PUBLISHED CONTENT USING DISTRIBUTED CRAWLING

(75) Inventors: Jacob William Green, Bloomfield Hills, MI (US); John Lane Schultz, Whiteford, MD (US); Yair Amir, Bethesda, MD (US); Michael Truman Goodrich, Irvine, CA (US)

(73) Assignee: The Johns Hopkins University, Baltimore, MD (US)

( * ) Notice: Subject to any disclaimer, the term of this patent is extended or adjusted under 35 U.S.C. 154(b) by 487 days.

(21) Appl. No.: 10/257,255

(22) PCT Filed: May 8, 2001

(86) PCT No.: PCT/US01/14701

§ 371 (c)(1),
(2), (4) Date: Aug. 2, 2003

(87) PCT Pub. No.: WO01/86507

PCT Pub. Date: Nov. 15, 2001

(65) Prior Publication Data

US 2004/0044962 A1 Mar. 4, 2004

(51) Int. Cl.
*G06F 17/30* (2006.01)
(52) U.S. Cl. .................. 707/2; 707/1; 707/10; 707/200
(58) Field of Classification Search .................... 707/2, 707/3, 7, 10, 1, 200
See application file for complete search history.

(56) References Cited

U.S. PATENT DOCUMENTS 5,855,020 A 12/1998 Kirsch
6,038,668 A 3/2000 Chipman et al.
6,151,624 A 11/2000 Teare et al.
6,418,433 B1 * 7/2002 Chakrabarti et al. ........... 707/5

OTHER PUBLICATIONS

Bowman, Mic C., Danzig, PeterB., Hardy, Darren R., Manber, Udi, Schwartz, Michael F., Wessels, Duane P., "Harvest: A Scalable, Customizable Discovery and Access System", Mar. 1995, University of Colorado—Boulder, pp. 1-29.*
Brin, Sergey and Page, Lawrence, "The Anatomy of a Large-Scale Hypertextual Web Search Engine", 1998, Stanford University, 20 pages.*
Douglis et al., "The AT&T Internet Difference Engine; Tracking and Viewing changes on the Web", 1998, Baltzer Science Publisher BV, pp. 27-44.*

* cited by examiner

*Primary Examiner*—Hung Q Pham
(74) *Attorney, Agent, or Firm*—Whitham Curtis Christofferson & Cook, PC

(57) ABSTRACT

A system for maximal gathering of fresh information added to a network such as the as the Internet and for processing the gathered fresh information. A link server (2) sends a batch of links to check (3) to a crawler (1B). Crawler (1B) them executes its crawling assignment by filtering the encountered content and extracting only that which is new or changed (4). Crawler (1B) then returns this content (4) to at least one data center and any interested web mining application (5). By using the crawlers (1A-E) to filter the data and only return or notify regarding, the fresh content, less bandwidth is needed to get the information to the web mining application (5).

19 Claims, 12 Drawing Sheets

Invention

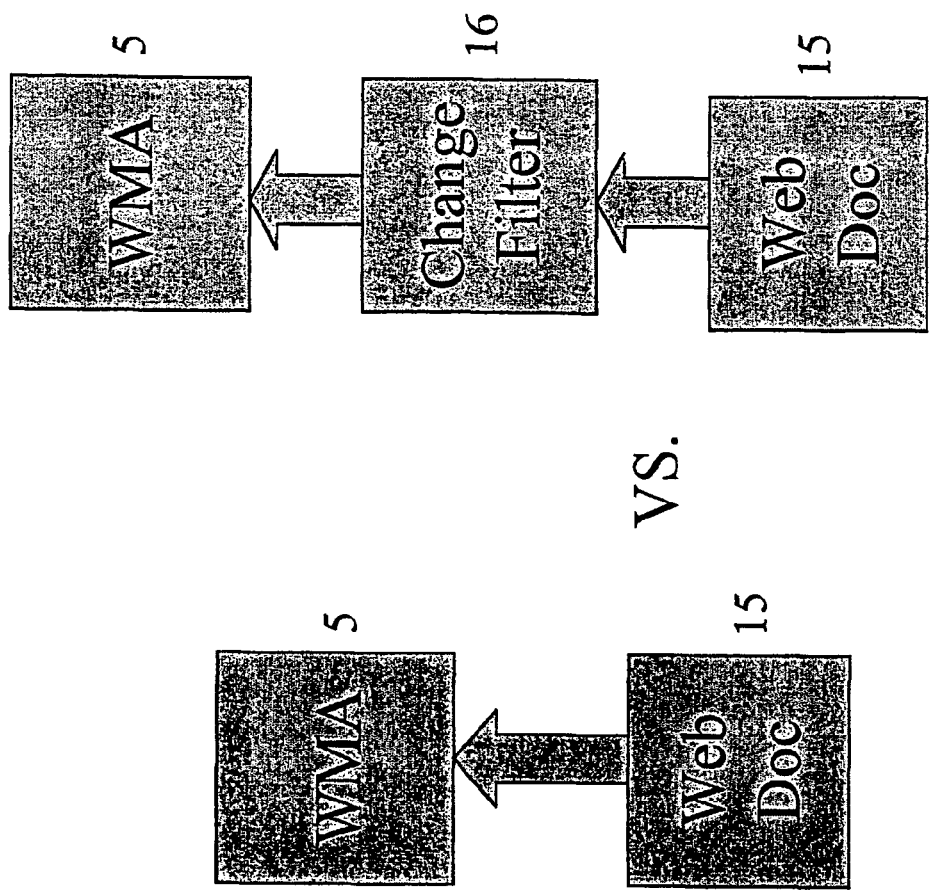

HIGH REFRESH-RATE RETRIEVAL OF FRESHLY PUBLISHED CONTENT USING DISTRIBUTED CRAWLING

STATEMENT REGARDING GOVERNMENT FUNDING

This invention was made under the DARPA Metacomputing project titled: "End to End Resource Allocation in Metacomputers", DARPA/ITO, Contract number G438-E46-2074. The Government may have certain rights in this invention.

FIELD OF THE INVENTION

The invention generally relates to a computerized network such as the Internet or World Wide Web ("WWW"), and more particularly, to maximizing retrieval of content freshly published on the network.

BACKGROUND OF THE INVENTION

The Internet has become an important computerized network, which can be accessed by computer users worldwide. Over the years, the number of Internet sites and the available content on the Internet has grown. Only in some cases does an Internet user already know the specific website address (e.g., www._____.com) to enter to access a desired website. Often Internet users want to retrieve certain subject matter, without being able to provide the Internet address(es) (i.e., the domain) at which such subject matter may be located. Such users want to be able to have a search of the Internet performed for them to retrieve their desired subject matter, and conventionally they have done so via so-called "search engines", such as www.google.com. For such searching, a user generally starts by visiting the search engine site (e.g., www.google.com), where the user encounters a field in which to enter his desired word(s) or phrase to search.

An Internet user querying a popular commercial search engine such as www.google.com or www.altavista.com will get back a listing of content that the search engine deems relevant to the query. While some search engines perform this task better than others, all known search engines before the present invention suffer from a common problem: a majority of the content they return is old. For example, with conventional search engines sometimes the most current content returned has been between one and three months old. This datedness is a real problem for some types of content, such as current events and news stories.

Current search engines work from an index to locate Web documents that satisfy a specified search criteria. The index is a limiting factor for the search engine, i.e., if the index only has "old" content, the search engine can do no better in returning information to the user query.

Preparation and maintenance of such an index conventionally has been accomplished by a "web crawler", which is a computer program that automatically retrieves numerous Web documents from one or more Web sites. A Web crawler processes the received data, preparing the data to be subsequently processed by other programs, such as creation of a search engine-useable index of documents available on the Internet.

Conventional crawlers have been proposed and are in use. However, the problem of returning current content continues to go unsolved. The fault in the current search engine systems of failing to return current content arises from a combination of two problems that have yet to be addressed.

The first problem is the slow scan rate at which search engines currently look for new and changed information on a network. The best conventional crawlers visit most web pages only about once a month. Because the scan rates of these conventional search engines are so slow there is no way for them to capture a majority of all the fresh content that is available. One reason why these crawlers scan so slowly is their dependence on a centralized crawling method where all of the crawlers crawl from a small number of sites on the network. This set-up causes a lot of the downloaded information to traverse the same network pipe. To reach high network scan rates on the order of a day with such an approach would be impractical, for requiring too enormous an amount of bandwidth flowing to a small number of locations on the network, because the cost would not be economically feasible. Due to such economics, most search engines have a scan rate of much slower than once a day.

A second problem that occurs is that current search engines do not incorporate new content into their "rankings" very well. Conventional search engines use certain methods to arrive at an Authority Measure for a page. For example, Google's PageRank ranking technology depends on the number of links a to-be-ranked page has linking to it in order to decide on the weight of the to-be-ranked page. Because new content inherently does not have many links to it, it will not be ranked very high under Google's PageRank scheme or similar schemes. Thus, for certain search engines, even if the search engine identifies a site as having relevant content, if the website has few links to it because of its newness, the search engine will rank it low in the list of retrieved site addresses that the searching user views. Some search inquiries can return thousands or more of addresses responsive to the request, so that being a low-ranked result of the search decreases the likelihood that the searcher will actually view the content.

Like Google, other conventional search engines also derive an Authority Measure for a page based on the number of links that point to the page. Thus normally an Authority Measure will be low for new pages. Newly created content, being new, is unknown to most people, and, not knowing about it, people have not put HTML (HyperText Markup Language) links in their documents pointing to it. Under conventional systems, new content maintains a low score, until more people find out about it and link to it.

Search engines fall into the general category of web-mining applications. These applications collect and extract large amounts of data from the web, for further processing. In the case of search engines, this further processing is the construction and maintenance of searchable indexes. Many other processing methods can be performed on this data. Examples of such applications include event notification systems, market analysis, corporate intelligence, etc. The field of data-mining is closely related to web-mining: in data-mining, data is usually processed from a database, whereas in web-mining, data is primarily processed from information on the web. The architecture of conventional web mining applications is-shown in FIG. 5A. Conventional web mining applications use polling methods, in which the applications must continually poll the data available on the network (such as the Internet) to determine what is there and what is changed. Conventionally, all data/web mining, including search engines, corporate intelligence, etc., have been using polling methods. Practically speaking, the conventional methods provide for visiting pages in set lists now-and-then, and seeing what is in the pages. The amount of work to be done when using such polling methods is extraordinarily large.

Somewhat separate from the development of the above-mentioned Internet searching technology, so-called "meta-computer" technology has been developing. The idea of a metacomputer was first popularized by the Seti@home project in 1996, relating to searches for Extra Terrestrials by scanning the sky for intelligent radio signals originating outside the solar system. Metacomputers then developed for more generalized uses.

A metacomputer system manages and contains a large number of machines (managing servers, and the contributor nodes). Together, the system created is a powerful virtual computer. In a metacomputer, like any computer, there is an operating system, and the applications that run on top of the operating system. In the original use by the Seti@home project, the application and operating system ("OS") were combined, and only the seti application could run on their system. Starting in about the first half of 2000, many companies took up this idea, creating such virtual computers on which people could run their distributed applications.

Such metacomputers require operating systems, and the Share System developed at Johns Hopkins by Jacob Green and John Schultz was an early development of such a virtual computer. Green et al have published information about the Share System, e.g., at www.cnds.jhu.edu. A metacomputer such as Share has a two-component basic architecture consisting of the Contributor Environment (CE) which runs on contributors' machines, and the Allocation Servers (AS) that hand out jobs to the CEs. Another such metacomputer was constructed by what was formerly known as PopularPower before March 2001 when it went out of business under that name. Another metacomputer is that of Distributed Science.net (created when ProcessTree merged with Dcypher.net). Other operating systems include Entropia.com, Applied-Meta.com, UnitedDevices and DataSynapse.

Eichstaedt et al. in U.S. Pat. No. 6,182,085 issued Jan. 30, 2001 for "Collaborative Team Crawling: Large Scale Information Gathering Over the Internet", recognize the need to make a crawler (gatherer) more efficient, and provide a method using multiple processors for collaborative web crawling and information processing. They use a set of crawlers running at the same location. However, a need still remains for systems for maximally retrieving, indexing, rating and making available current content on a network.

U.S. Pat. No. 6,151,624 to Teare et al., issued Nov. 21, 2000, entitled "Navigating Network Resources Based on Metadata", provides for the crawler to execute every 24 hours. (Column 17.) The crawler polls Web sites on the Internet to locate customer sites that have updates, and a database is updated. (Column 18.) Although the crawler is commanded to execute every 24 hours, index files are only updated weekly based on the database. (Columns 17-18).

Thus, improved technology is needed for successfully gathering fresh content from a network such as the Internet especially that can operate without getting bogged down by the vast amount of unchanged content on the Internet. Also, there remains a need for technology to effectively rank new content.

SUMMARY OF THE INVENTION

It therefore is an object of this invention to provide a method of expediting retrieval of new content published on the Internet or another network.

It is a further object of the invention to provide a method of using a distributed crawling system for efficiently and promptly gathering new content published on the Internet or another network.

Additionally it is an object of the present invention to expedite the time in which new published content on the Internet or another network may be accessed by a user posing a content-based query, or web mining application.

Additionally, it is an object of this invention to provide a model for creating and maintaining web mining applications (like search engines) based on update notifications, and not needing to rely on continual polling of the data.

Additionally, it is an object of this invention to provide a platform on which many web mining applications can listen to a commonly available set of update notifications to build their application and stay current.

In order to accomplish these and other objects of the invention, the present invention in a preferred embodiment provides systems for processing fresh information added to a network, such as a system comprising, for a network, identifying fresh information added to the network; and presenting the fresh information as a stream of events. The invention may be used wherein the network is the Internet or intranet.

In a particularly preferred embodiment, the invention provides for the stream of events to be made available for concurrent use by a plurality of web-mining applications.

The invention further provides for the system optionally to include rating the fresh information.

In another embodiment of the inventive system, the fresh information identification may be by a metacomputer deployed to identify fresh information.

In another embodiment, the invention provides a method of gathering information freshly available on a network, such as a method comprising deploying a metacomputer to gather information freshly available on the network, wherein the metacomputer comprises information-gathering crawlers instructed to filter old or unchanged information.

The invention in another embodiment provides that the information-gathering method may include deploying a distributed system of crawlers. A further embodiment of the invention provides for commanding the crawlers to encounter content on the network and to filter encountered content for freshness. Another embodiment of the invention provide for the filter of encountered content for freshness to comprise instructions to filter old or unchanged information and to gather only information on the network that is new or changed. In the invention, in a particularly preferred embodiment of using the crawlers, the crawlers sit on a plurality of machines across the network.

In another embodiment, the invention provides for using a metacomputer that includes at least one link server for receiving content from the crawlers. In a particularly preferred embodiment of the invention, crawlers are commanded to return only the fresh encountered content to the link server. The invention in a further embodiment provides that data is compressed before being sent by a crawler.

In another preferred embodiment, the invention also provides a high scan rate, decreased bandwidth method for data delivery, such as a method comprising: (A) providing at least one coordinating Link Server to direct a plurality of crawlers through low bandwidth commands, (B) providing that when a crawler is instructed by the Link Server to check a page link, for the to-be-checked page link the crawler also is told information including URL name, last time checked, and a last crawl date page digest from when the link was last checked; (C) connecting a crawler to the to-be-checked page and commanding the crawler to read a header of the to-be-checked page, and (1) commanding the crawler that if the to-be-checked page header returns a last modified date, the crawler check the page against the last crawl date associated with the to-be-checked page; further provided that: (i) for a to-be-checked page found to be unchanged, the crawler bypasses and does not download/process the to-be-checked page; but (ii) if the to-be-checked page is found to have changed since the last checked time, the crawler notifies the Data Center that the to-be-checked page has been changed, downloads, processes, compresses and sends the to-be-checked page content to the Data Center, (2) commanding the crawler that if no last modification date is found in the to-be-checked page header, the crawler downloads the page, and then runs the downloaded page through a function at the crawler to obtain a new page digest for matching against a last crawl page digest, if any, provided that: (i) if and only if the new page digest can be matched to a last crawl page digest, the crawler proceeds to the next link to be checked; but (ii) if for the new page digest no matching last crawl page digest is found, the crawler then notifies the Data Center and/or transmits the new page digest to the Data Center, further provided that the crawler returns the links originally received from the Link Server with updated digests and crawl times.

The invention also in a further embodiment provides for a method wherein whenever the crawler downloads a page determined to be new or changed, the crawler optionally extracts the links on the downloaded page and reports the extracted links to the Link Server. Such methods according to the invention in a further embodiment may include identifying if extracted links are valid by commanding the crawlers to attempt to connect to the extracted links from a downloaded page. The invention also provides for methods including commanding the crawler, once connected, to also filter out the links and only extract and return HTML/TEXT links.

The invention in a further preferred embodiment provides methods that include information processing by the crawlers on the downloaded pages. In such inventive methods, the information processing may be stripping out HTML tags and using information retrieval and/or natural language processing techniques to characterize the document.

In another embodiment, the invention provides for methods that include updating Link Server records on the links and scheduling them for later crawling or re-crawling, such as management by the Link Server of link assignments for crawling. In a further preferred embodiment, the invention provides for management by the Link Server to comprise assigning network-wise close links to a crawler and/or arranging for relatively more frequent crawling of links from domains with track records of frequent change.

In a further preferred embodiment, the invention provides methods and systems in which the Data Center, upon receiving new or changed content conducts at least one of the following: (a) storage of the new or changed content; (b) storage of only delta changes of a page; (c) data mining; (d) data processing; (e) application of data to at least one search engine; (f) intelligent caching.

The invention also provides methods of processing new information on a network and of rating gathered fresh information, such as a method comprising: (A) for information encountered on the network that is new relative to a data base of existing content, identifying at least one existing document within a predetermined distance from the newly encountered information; and, (B) identifying an already-established weight of the at least one existing nearby document identified according to step (A). The inventive method in a further embodiment may include, for the newly encountered information, assigning a weight measurement partially based on the already-established weight(s) identified in step (B) of the at least one existing nearby document. A particularly preferred embodiment of the invention provides time-adjusted weighting of the new information, such as time-adjusted weighting of the new information comprising assigning a time dependent function to the assigned weight measurement, wherein as the new information ages, less weight based on the at least one existing nearby document is accorded the new information.

The invention in another preferred embodiment provides a ranking method for new or changed content on a network, such as a method comprising partially ranking the new or changed content based on at least one neighboring page. In a further embodiment, the invention provides a ranking method wherein the partial ranking of a new page X with a URL of form http://www.xyz.edu/a/b/c/d/X.html, wherein "xyz" may be any domain name, ".edu" may be any web suffix including but not limited to .com, .net and .tv and a, b, c and d are variables, comprises assigning a Temporary_Authority_Measure based on at least one Authority_Measure of at least one page in the same a/b/c/d/ directory or in a page that is a predetermined distance from the new page. In another embodiment, the inventive ranking method includes reducing the effect of any neighboring page with time. In a further embodiment, the invention provides a method wherein the ranking method includes a time-dependent reduction of the $Temporary_{13}$ Authority_Measure.

The invention in another preferred embodiment also provides computer-readable information, such as computer-readable information produced (A) from a stream of events comprising fresh information identified for a network; or (B) by deploying a metacomputer to gather information freshly available on the network, wherein the metacomputer comprises information-gathering crawlers instructed to filter old or unchanged information. The invention in additional preferred embodiments provides a computer data base of such computer-readable information, and an index prepared from such a computer data base. The invention in another preferred embodiment provides an electronic library wherein the library consists essentially of such an index. In another preferred embodiment, the invention provides a computerized search engine wherein the search engine queries an index prepared from such computer-readable information.

The invention in another preferred embodiment provides a distributed system of crawlers returning content from a network to a link server, wherein each crawler: (1) minimizes time spent on old and unchanged content; (2) filters and excludes from returning old or unchanged content to the link server; and (3) gathers and returns fresh content to the link server.

Also, in another preferred embodiment, the invention provides a monitoring method for at least one web mining application, such as a method comprising screening web documents for changed content, wherein the screening occurs in a system external to the web mining application. In a particularly preferred embodiment, the inventive monitoring method includes, in the external system, locating changed content and preparing a stream of updates characterizing the changed content. In another particularly preferred embodiment, the inventive monitoring method includes providing the stream of updates to the at least one web mining application. In a further embodiment, the inventive monitoring method is one wherein the stream of updates is provided to multiple web mining applications. Another inventive embodiment provides a monitoring method wherein the stream of updates is simultaneously useable by the multiple web mining applications.

A further embodiment of the invention provides a monitoring method wherein the screening includes applying a change filter to prohibit unchanged web documents and other repetitive content from reaching the web mining application In a particularly preferred embodiment, the invention provides a monitoring method wherein the change filter comprises a data center cooperating with a network/metacomputer system.

BRIEF DESCRIPTION OF THE DRAWINGS

The foregoing and other objects, aspects and advantages will be better understood from the following detailed description of the preferred embodiments of the invention with reference to the drawings, in which:

FIGS. 5A and 5C are each flow charts of a conventional polling model.

DETAILED DESCRIPTION OF THE PREFERRED EMBODIMENTS OF THE INVENTION

Figure 1A:
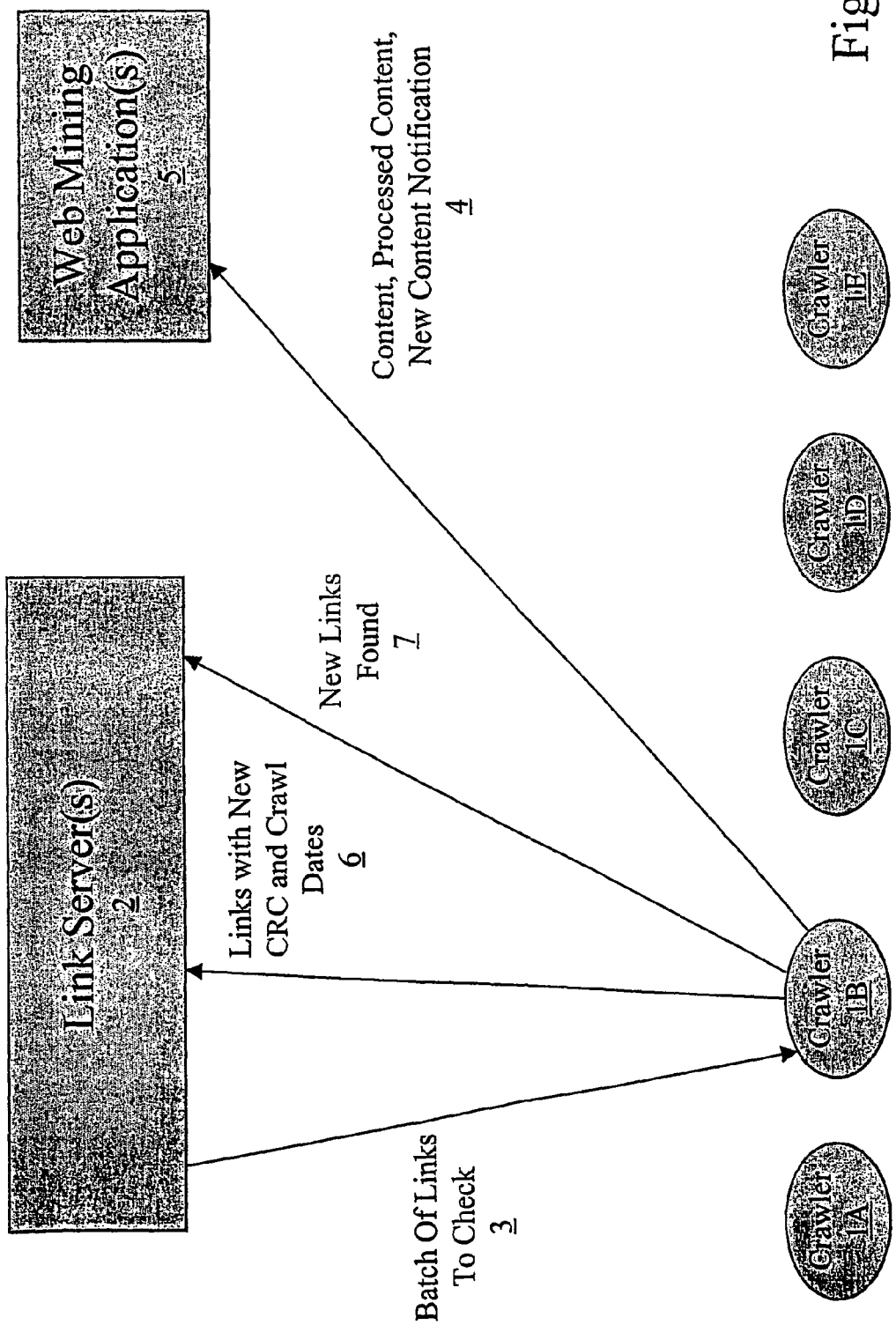
FIG. 1A is schematic diagram of a high scan rate architecture that is a distributed system according to the present invention.

In a first preferred embodiment, the invention uses a distributed system of crawlers to efficiently gather new and changed published information on a network. In a most preferred embodiment, the distributed system is a metacomputer system. Examples of a suitable metacomputer include the Share Metacomputer developed by Green et al. at the Johns Hopkins University, and the systems of PopularPower.com, processtree.com, DistributedScience.net, Entropia.com, AppliedMeta.com, UnitedDevices, DataSynapse, and the like.

A metacomputer operating system suitable for use in the present invention is made up of many participating computers on the network (such as the Internet). The metacomputer consists of the Contributor Environments (CE) and the Allocation Servers (AS). The CE is a software application that is installed on a contributor's computer, which can be any modem computer with a network connection. The CE runs as a low priority background process, to minimize the impact on performance experienced by a normal user of the computer, and to basically harness only the unused resources of the contributor's computer. The task of the CE is to download, monitor and run jobs given to it. The AS coordinates the efforts of all the nodes in the metacomputer. The allocation server(s) hand out jobs to the CEs, trying to efficiently use the combined resources of all the nodes. The AS has the ability to add or remove any job running on a node, and to upgrade the CE application to the newest version.

The present invention uses a metacomputer with a suitable operating system, such as Share combined with the distributed crawling systems such as that of the HyperDog System; the distributed crawling system in U.S. Pat. No. 6,182,085 issued Jan. 30, 2001 to Eichstaedt et al. of IBM, entitled "Collaborative Team Crawling: Large Scale information Gathering Over the Internet"; or the distributed crawling system of S. Brin and L. Page, "The Anatomy of a Large-Scale Hypertextual Web Search Engine," the 7$^{th}$ International World Wide Web Conference (WWW7), 1998.

In a preferred embodiment of the invention, the operating system is the Share system, a virtual OS that runs the metacomputer. The Share system preferably is used with the HyperDog system, a distributed crawling system that is an example of a system that works well on a metacomputer. The HyperDog system is an example of a system that distributes the crawlers to many points in the network through a metacomputer, so that the crawling algorithm gains advantages such as bandwidth savings to the central indexing point. The crawlers filter the pages they crawl and only return back the pages they perceive as new or changed since their last visit. Because only a small portion of the WWW changes each day, the changes sent back to the central indexer are greatly reduced compared to conventional crawler technology. The crawlers further save bandwidth by compressing their communications with the indexers.

Using a metacomputer with a distributed crawling system according to the invention provides at least several advantages. When scan rates are high (on the order of daily), a savings of about two orders of magnitude can be achieved. Also, using a metacomputer system provides ease of manageability and use. Individual machines in a metacomputer are self-managed and administered, and are normally replaced or upgraded on a regular schedule. To the centralized indexer, the metacomputer represents a black box that feeds the indexer the changes that are occurring on the WWW, without having to manage the crawlers or the infrastructure on which they run. The indexers experience the event driven model where event notifications are received through a stream of changes from the black box.

A system such as HyperDog gives the indexers all the updates that occur without overwhelming the indexers with redundant pages that have not changed. Because the recrawls are done in a distributed fashion, greater speed is achieved through parallelization. Initially the speed will be relatively slow because everything will be "new" or "changed" to the crawlers. In this initial phase the crawlers will be discovering the existing content on the WWW. After the initial phase, a system like HyperDog will reach a relative steady state, where only the normal growth of the WWW will be reported.

By using such a system and generating a stream of update notifications, many indexing or web-mining applications can share the costs of crawling. Unlike many of the conventional web-mining applications, which effectively reproduce each others' same crawling work, the stream of updates according to the present invention allows for shared commonalities, with each application customizing the data to its own differing web-mining needs.

The operating system, of which Share is an example, manages all the nodes of the metacomputer. The operating system leases time on the virtual computer to companies (or others) that have applications that those companies want to use. The system of the present invention is such an application for desired use (called HyperDog). The crawlers in the crawling system of the invention get run on nodes of the metacomputer. It is the metacomputer's responsibility to hand out the crawling application to its nodes, to make sure they are up and running, and to make sure that the nodes are not being harmed by the application.

This distributed system of crawlers may sit on many machines across the network, as depicted in FIG. 1A, as in a preferred embodiment of the present invention. With reference to FIG. 1A, crawlers 1A, 1B are shown. Crawlers 1A, 1B, etc. may be, but are not necessarily required to be, the same. Crawlers 1A through 1E are shown in FIG. 1A by way of example, but it will be readily appreciated that the number of crawlers is not limited.

As shown in FIG. 1A, a preferred embodiment of the invention uses at least one Link Server 2. One or more LSs may be added in addition to LS 2. The LS 2 is selected to obtain a high scan rate, by a decrease in bandwidth to a web-mining application, and the LS is capable of directing the crawlers through low bandwidth commands. The LS is programmed for sending a link or batch of links to a crawler selected by the LS. The LS further is programmed for including in each such link the to-be-checked URL name, and, if applicable, the last time it was checked and a page digest from when it was last checked.

A suitable LS for use in the present invention is one that is programmed to update its records on links and schedule them for later crawling. A Link Server can "hand out" links to a crawler blindly but more preferably the Link Server will be "smart" about the hand-outs. Namely, the Link Server preferably tries to hand out links to crawlers that are "network-wise" close to each other, send out links more frequently from domains with track records of frequent change, and otherwise optimize crawling efforts.

In FIG. 1A, Link Server 2 is shown communicating with crawler 1B. However, it will be appreciated that Link Server 2 communicates with other crawlers, such as crawlers 1A, 1B. Additionally, a crawler is not necessarily restricted to communication with a single Link Server, but generally a crawler is in communication with one Link Server, such as crawler 1B being controlled by Link Server 2. A crawler is programmed for connecting to a to-be-checked page and reading the page header. A crawler further is programmed that if the page returns a last modified date, the crawler is to check this date against the last crawl date information associated with this link. A crawler is programmed so that if the page has changed since the last time it was checked, the crawler will either let the LS and web-mining applications know that it has changed, or download, process, and compress the page content for sending to the LS and web-mining applications.

A suitable crawler for use in the present invention is one which "filters" to-be-checked pages to minimize time spent on unchanged pages and to minimize or eliminate downloading and sending of unchanged pages, while recognizing and gathering fresh information.

One example of a crawler that minimizes time spent on an unchanged page, by first being programmed so that if the crawler finds from the page header that the page has not changed, the crawler will proceed immediately to the next page. Second, the crawler is programmed that if the web server serving a to-be-checked page does not report the date the content was last modified, the crawler will download the page, and run the downloaded page a function at the crawler to get a digest of the downloaded page. The crawler is further programmed that if such a new digest matches the digest from the last crawl of the page, then the crawler is to assume the page to be unchanged and proceed to the next link.

One example of a crawler that recognizes fresh content is a crawler programmed that upon finding that a crawler-prepared digest does not match the digest provided to the crawler, then the crawler is to assume that the page has changed and is to notify and/or send the data to the LS. A crawler may batch up these return notifications to be sent back to the LS. Such batching-up reduces the communications overhead of reestablishing any communication channels between a crawler and a LS.

Preferably, a crawler used in the present invention is one that, upon downloading a page and determining that it is new or changed, also will extract the links on the downloaded page for reporting back to the LS. Also, preferably, a crawler for use in the present invention preferably is one that will return the links originally received from the LS, with updated digests and crawl times.

Modifications and variations on to the crawlers mentioned above by way of example may be made, within the present invention.

In the invention, a plurality of a single type of crawler may be used, or, different crawlers may be used in various combinations.

Figure 1B:
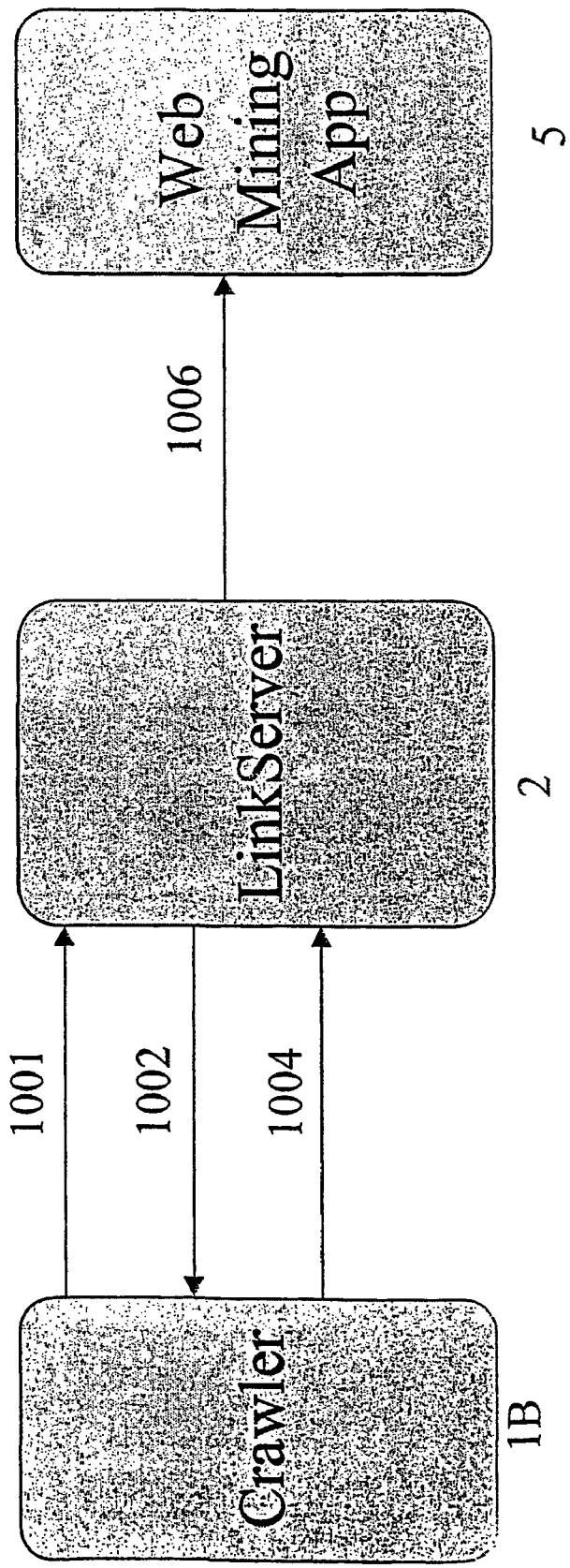
FIG. 1B is a schematic diagram of interaction between components of a high scan rate architecture system according to FIG. 1B.

An example of a relationship between a link server 2, crawler 1B and web mining application 5 in FIG. 1A may be appreciated with reference to FIG. 1B. The crawler 1B requests (1001) the Link Server 2 for an assignment of URLs to check. The link server 2 sends a batch of URLS (1002) to the crawler 1B. The crawler 1B checks the URLs as requested to determine which, if any, have changed. The crawler 1B returns the updated state of the URLs and any content changes (1004) to the link server 2. The link server 2 updates the state of the returned LTRLs and broadcasts (1006) to the web mining application 5 URL updates for those LTRLs that have changed. The broadcast updates are used by the web mining application 5 to keep web mining applications running. The cycles of URL requests, batch sending and returning (1001, 1002, 1004) preferably repeat continuously. Request initiation (1001) is by crawler 1B in FIG. 1B, but may be by any crawler seeking work to perform.

An example of a system, in operation, according to a preferred embodiment of the invention, having a LS and crawlers as set forth above, is as follows, discussed with reference to FIGS. 1A, 1B and 2.

Link Server 2 sends a batch of links to check 3 to a crawler 1B. According to the batch 3, crawler 1B then executes its crawling assignment, during which the crawler 1B encounters content. The crawler 1B filters the encountered content and extracts only that which is new or changed, and then returns this content 4 to at least one data center and preferably any interested web mining applications 5.

Web mining application 5 may be a database or similar storage center that can process the data at web mining application 5. One or more additional web mining applications may be used. The content 4 provided by the crawlers 1B, etc. includes content, processed content and new content notification.

By using the crawlers 1B, etc. to filter the data and only return or notify regarding the fresh content, less bandwidth is needed to get the information to the web mining application 5 (from the viewpoint of the web mining application 5). Compressing the data from the crawlers 1B to the web mining application 5 further reduces the bandwidth costs. In turn, reducing the bandwidth requirements of a web mining application increases the rate at which a web mining application can "scan" or find out about new information on the network. This increased scan rate allows each web mining application to learn about new information quickly.

Again with reference to FIG. 1A, in the invention the crawler 1B returns to Link Server 2 old links with new digests and crawl dates 6 and new and dead links 7 that the crawler 1B has found.

Figure 2:
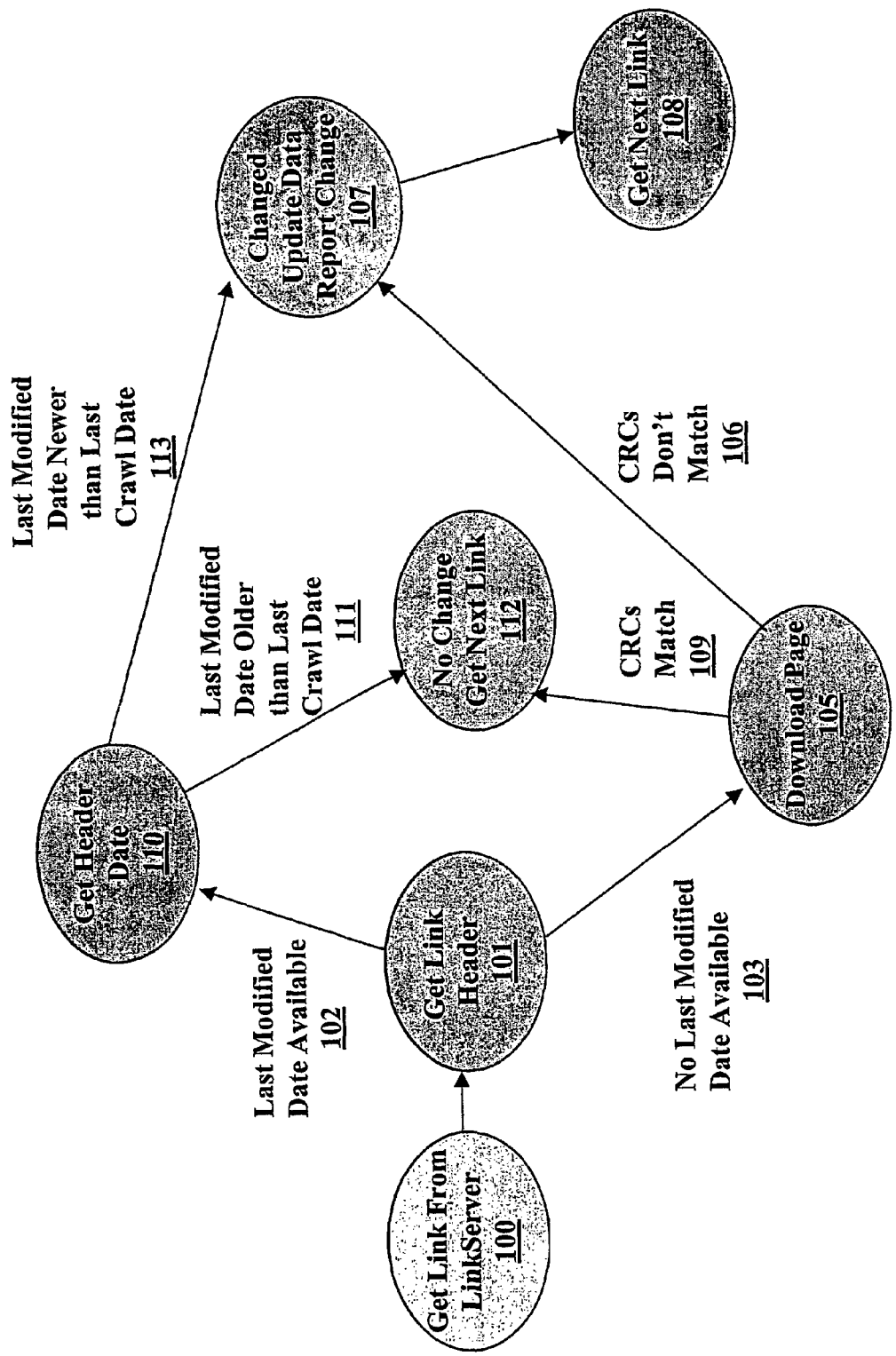
FIG. 2 is a schematic diagram of changed and new content testing according to the present invention.

A preferred embodiment of the invention also may be appreciated with reference to FIG. 2, showing functions performed by a crawler 1B from FIG. 1A. Namely, after getting a link from the link server 100, the crawler gets a link header 101. If the crawler finds no last modification date on the header 103, the crawler downloads the page 105. For the downloaded page, a hash of the page content is taken; i.e., the page is run through a function to get a unique identifier ID). The next time the page is checked, if the page content has changed, this process will produce a new unique ID. A cyclic redundancy check (CRC) is one method of doing this. The crawler checks whether the CRCs match 109 or do not match 106. If the CRCs do not match 106, the page is processed, the crawler performs an updating process 107 of updating links for the CRC and for crawl date, and the crawler 1B returns the link and processed page to the Link Server 2 and gets the next link 108.

If, however, after getting the link header 101, the crawler finds a last modified date available on the header 102, the crawler gets the header date 110 and determines if the header date is older or newer than the last crawl date. If the header last modified date is older than the last crawl date 111, the crawler treats the page as having no change and gets the next link 112.

If the crawler finds that the header date has a last modified date newer than the last crawl date 113, the crawler performs an update 107 and returns the link and processed page and gets a next link 108.

Particularly, it will be appreciated that in the case where the link has never been crawled by a crawler in the crawling system, the link will lack a digest and last crawl date, and so the crawler that encounters such a link will download the link and report the information back to the LS 2.

In such a system as discussed above, it will be appreciated that the web mining applications 5 receive new information without competing old information. Thus, the web mining applications 5 can process the new information with fewer resources—thus more quickly and efficiently—than if the new information had accompanying old information. The event-driven model thus provides superior results over, and is distinguished from, the polling model.

It will be appreciated that the above activities have been discussed for a single crawler while the system is in operation, but that meanwhile each of the crawlers in the system is proceeding likewise on its own with regard to other pages.

Moreover, there are a number of further activities that optionally may be performed by the crawlers. For example, the crawlers optionally can attempt to connect to the links that are extracted from a downloaded page. This activity will identity if the links are valid. Another optional activity is that, once connected, the crawler can filter out the links and only extract and return links of a certain type, such as only links of the MIME type HTML/TEXT. Also, the crawlers optionally can perform information processing on downloaded pages to save on the computation time by the-web-mining applications. Processing examples include: stripping out HTML tags; using information retrieval and/or natural language processing techniques to understand the subject matter of the document and/or categorize the document.

It will be appreciated that the a web-mining application is not limited in its use of the received data and may use the received data in many ways. When a web-mining application is notified or receives new or changed content, some of the options for proceeding include: store this information; store only the delta changes of a page (like a software version control system); mine the data; process the data for use by a search engines; provide intelligent caching, and the like.

Where more than one web mining application is provided, the web mining applications may be combined and used together as is known to those working with computer systems.

Figure 3A:
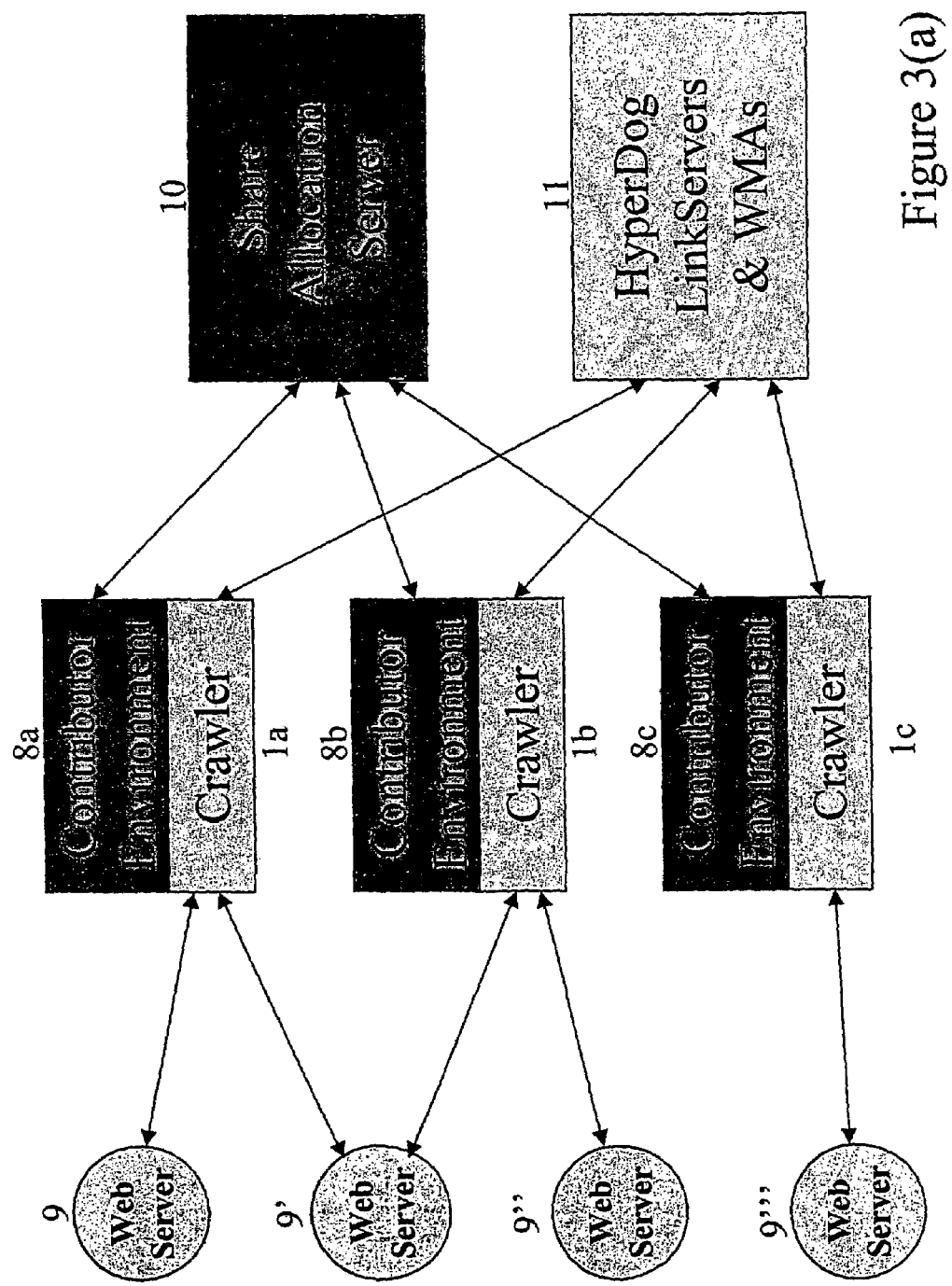
FIG. 3A is a flow chart for a crawling system according to the invention, in the context of a share allocation server and metacomputer.

With reference to FIG. 3A, an example of using the invention in the context of a metacomputer system such as Share is shown. Each crawler has a respective contributor environment, such as contributor environment 8A for crawler 1A. Each crawler is in communication with one or more web servers, such as crawler 1A in communication with web servers 9 and 9', and crawler 1C in communication with web server 9'''. Each contributor environment 8A, 8B, 8C is controlled by the share allocation server 10. Each crawler 1A, 1B, 1C is in communication with the HyperDog system of LinkServers and web mining applications 11, an example of a link server being link server 2 in FIG. 1, and an example of a web mining application being web mining application 5 in FIG. 1.

Figure 3B:
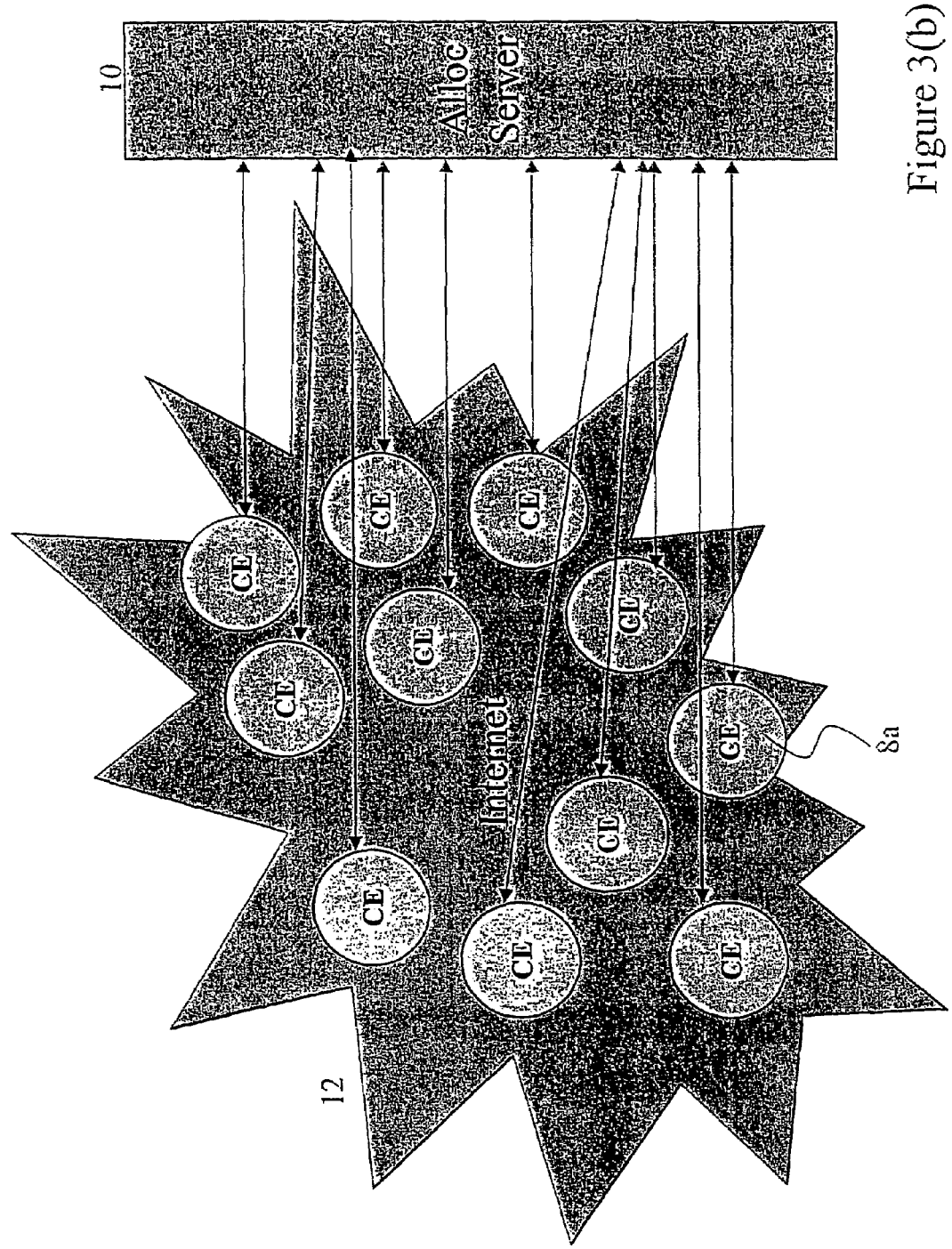
FIG. 3B is a flow chart for a crawling system according to the invention, in the context of the Internet.

Referring to FIG. 3B an example of using the invention in the context of the Internet is shown. In this example, a plurality of contributor environments (CE) are shown, such as CE 8A (also shown on FIG. 3A). The CEs such as CE 8A are dispersed on the Internet 12. Each CE, such as CE 8A, is in communication with the allocation server 10.

Figure 4:
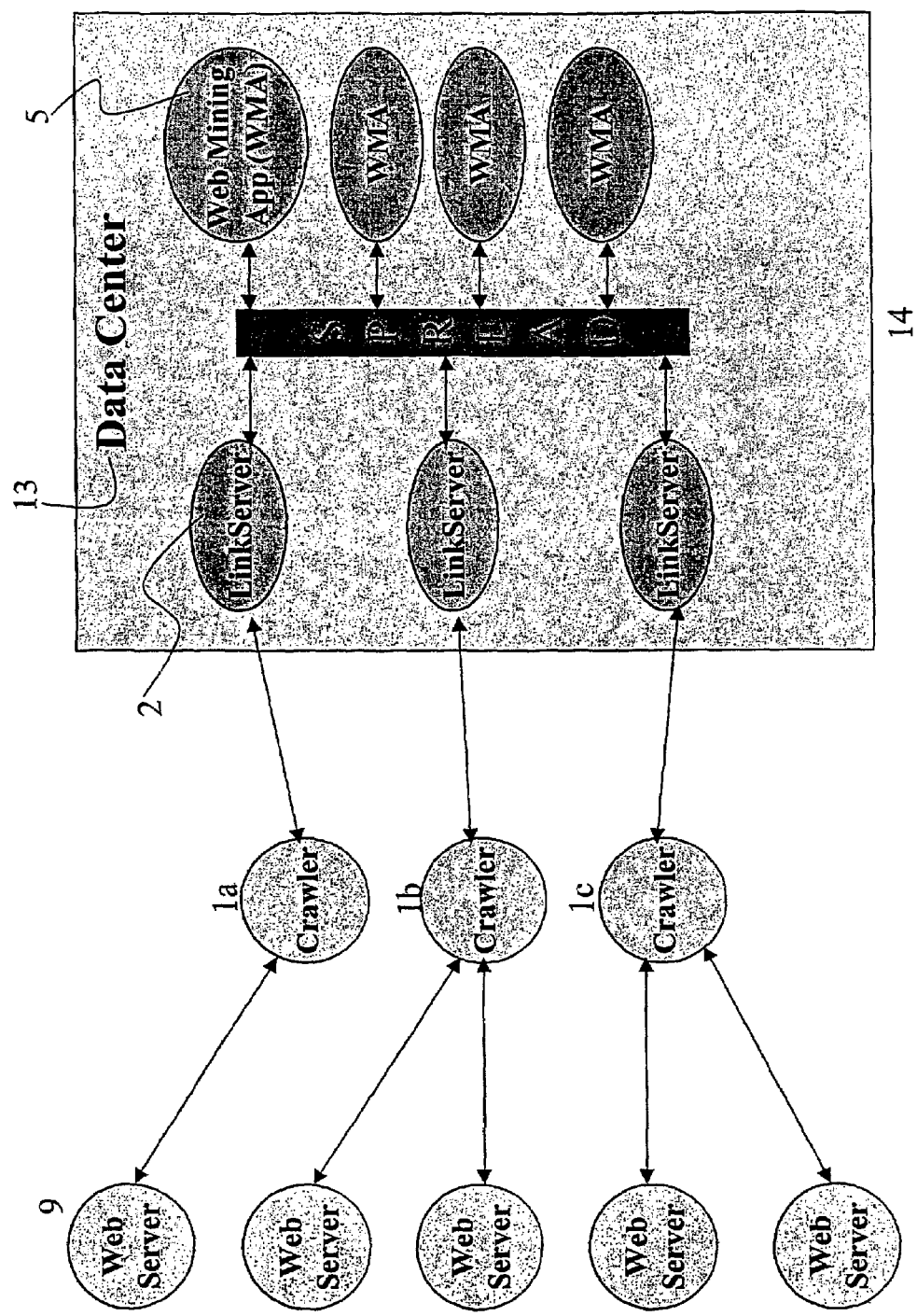
FIG. 4 is a flow chart of a stream of update created by a crawling system according to the invention, and the web-mining applications that are built by and stay current based on the invention.
Figure 7:
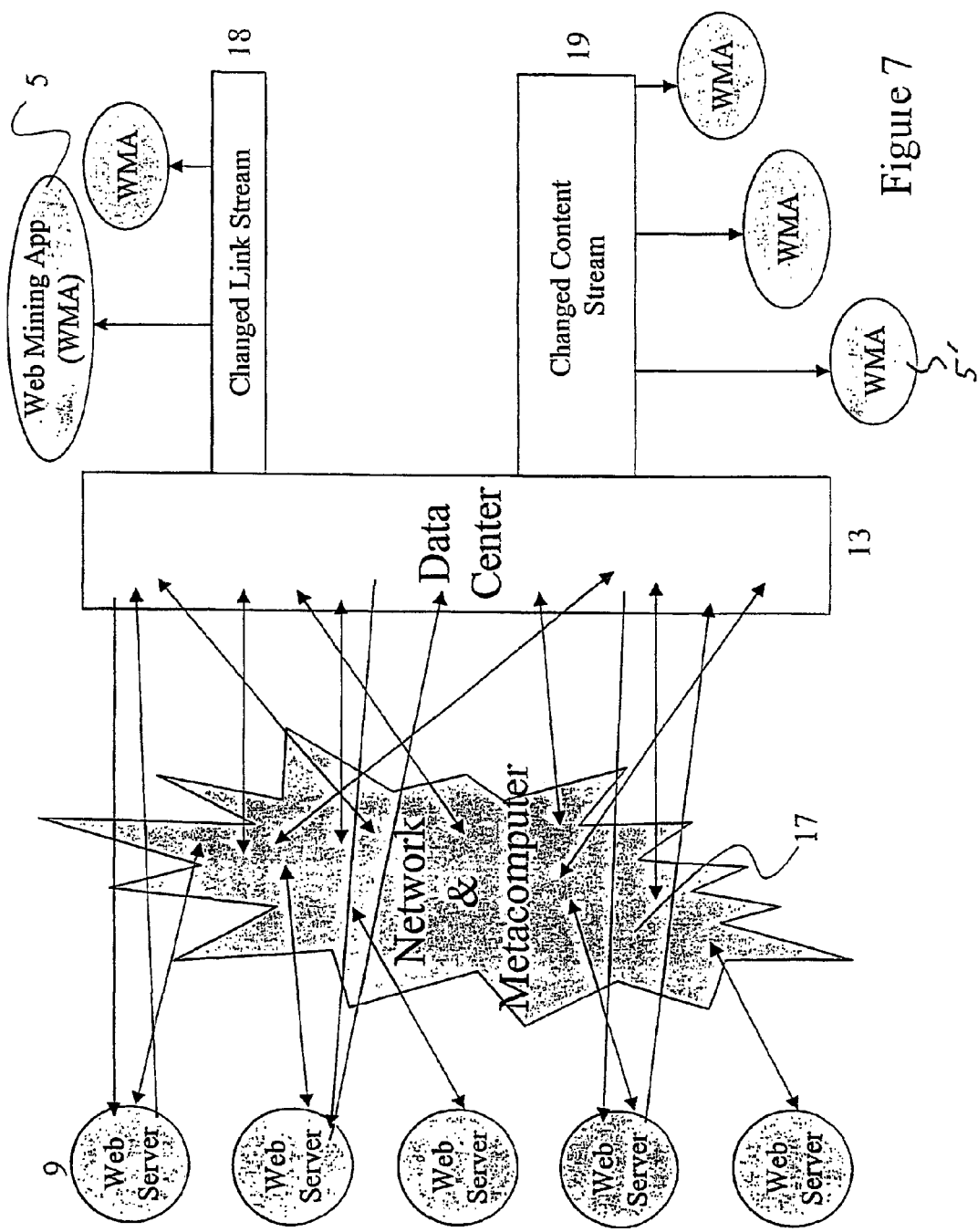
FIG. 7 is a flow chart of a monitoring system according to the invention.

The present invention makes possible dissemination of update notifications to listening web-mining applications. Such dissemination of update notifications may be performed, by way of example, as shown in FIG. 4. FIG. 4 shows a stream of update created by a crawling system according to the invention, and the web-mining applications 5 that are built by and stay current based on the invention. In the crawling system as shown in FIG. 4, which is a non-limiting example according to the invention, a data center 13 is provided. The data center 13 comprises a plurality of link servers 2 and a plurality of web mining applications (WMA). The WMAs do not necessarily have to reside within a datacenter, as shown in FIG. 7, and can be owned and operated by third parties that use standard communications to listen to the stream of updates. The data center 13 is in communication with a plurality of crawlers. A plurality of crawlers 1A, 1B, 1C are in communication with a plurality of web servers 9. The crawlers 1A, 1B, 1C return information to a plurality of link servers 2, which in turn provide their new information to a spreading system 14 which in turn selectively provides new information to a plurality of web mining applications 5. In the exemplary spreading system as shown in FIG. 4, the spreading system 14 receives all new information. The spreading system 14 controls the distribution of the new information so that each web mining application 5 receives desired new information but not old information and not new information that is unwanted by the particular web mining application 5.

In another embodiment, the invention provides a monitoring system, an example of which is shown in FIG. 7. The monitoring system provides for a plurality of crawlers 1B to communicate with a data center 13 through a network/metacomputer system 17. From the received information, the data center 13 can produce a changed link stream 18 and a changed content stream 19. The changed link stream 18 may be provided to selected web mining applications, such as WMA 5. The changed content stream 19 may be provided to selected WMAs, such as WMA 5'.

Advantageously, the invention makes possible an event driven system for web mining applications, so that the cumbersome conventional polling systems may be avoided. Advantages of an event driven model according to the invention, contrasted with a conventional polling model, may be seen with reference to FIGS. 5A and 5B. FIG. 5A depicts a conventional polling model, in which the WWW is sampled by a plurality of applications, App 1, etc. In the polling model of FIG. 5A each of the applications separately downloads and processes all documents, leading to much duplication and repetition of effort.

Figure 5B:
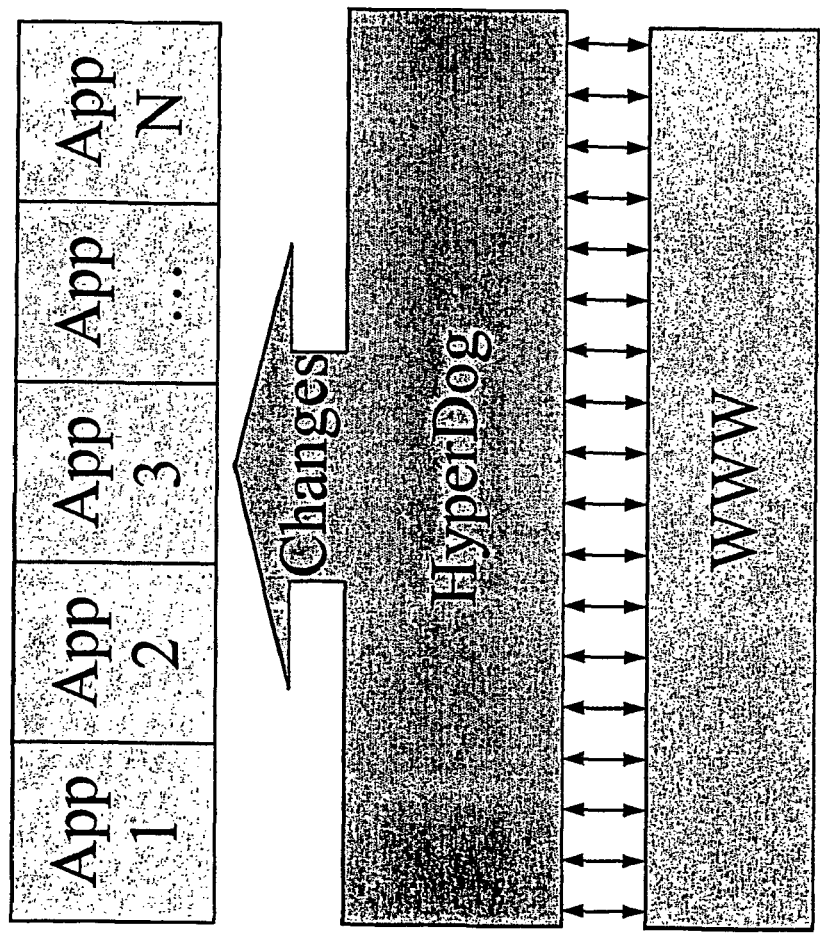
FIGS. 5B and SD are each flow charts of an event driven model which is an example according to the present invention.
Figure 5A:
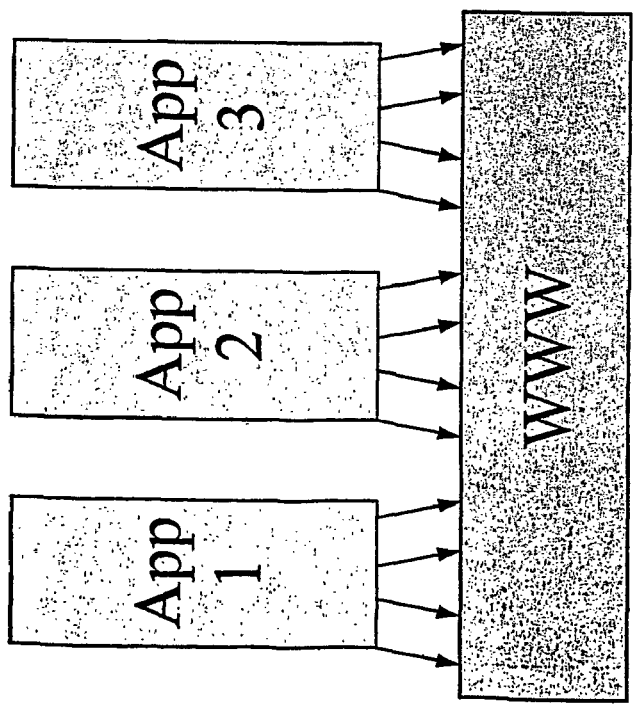

In an event driven model according to the invention, an example of which is shown in FIG. 5B, a HyperDog system performs polling and downloading, filters the content, and provides selected content (i.e., changes) to the applications. The applications thus are only faced with processing a small percentage of content on the WWW, namely, changed content.

Advantages of the invention when event driven web mining is used may be seen with reference to the contrasting flow charts of FIGS. 5C and 5D. In the conventional polling methods, a web document 15 is delivered in its entirety to a web mining application 5, as shown in FIG. 5C. Advantageously and by contrast, the invention makes possible the delivery of information in more useful form to the web mining application 5, as shown by way of example in FIG. 5D. For example, in the invention, a web document 15 may be processed by a change filter 16 and sent to web mining application 5 in processed form rather than in its entirety. The invention makes possible the processing (such as by change filter 16) of some or all documents before they are provided to a web mining application. Change filter 16 may be used in the invention to process any document before it reaches the web mining application. Change filter 16 may be used to filter unchanged documents so that only new or changed web documents can reach the web mining application 5.

Figure 6:
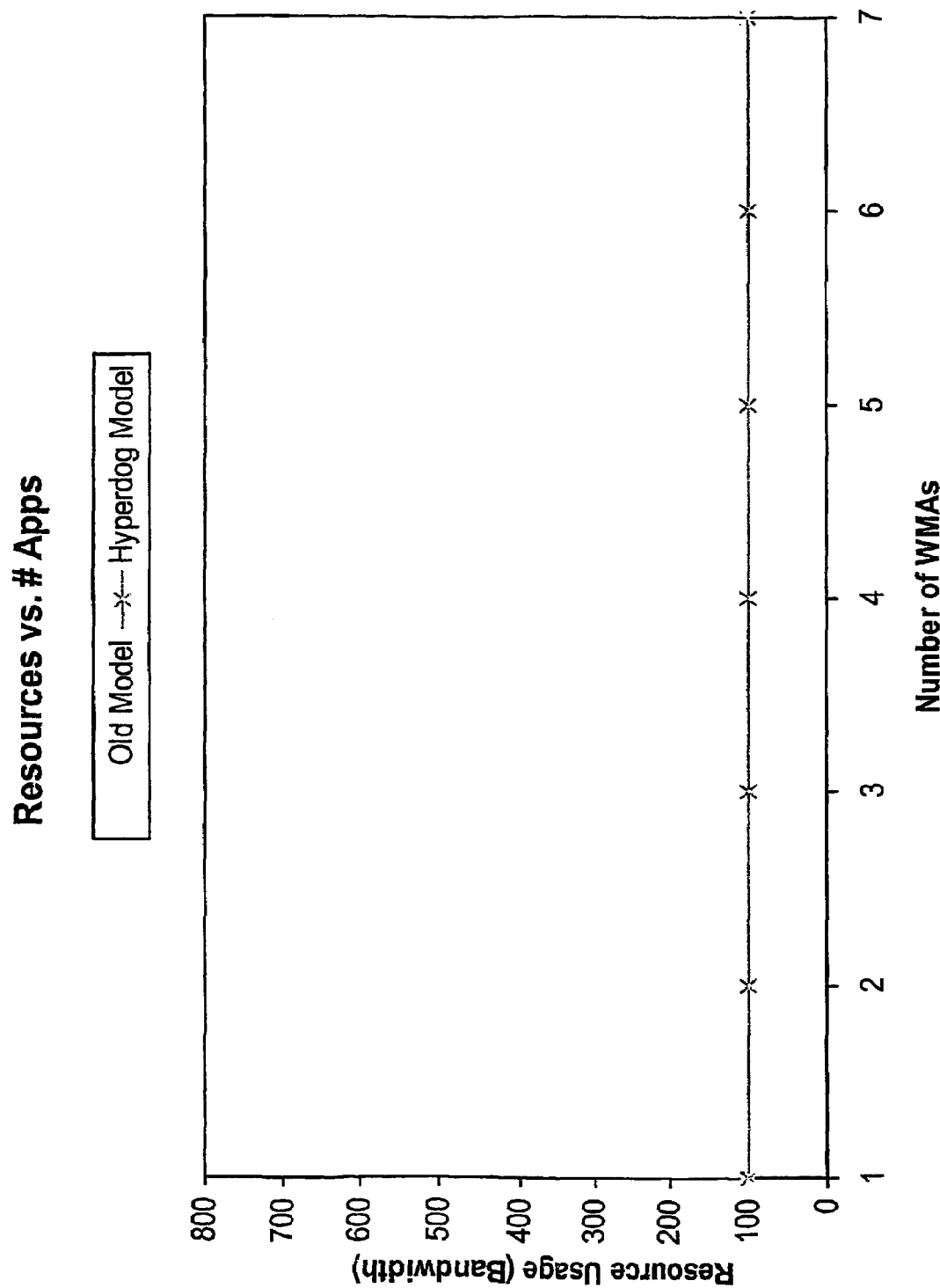
FIG. 6 is a graph of resources versus number of web mining applications, contrasting a conventional polling model with an example of an inventive model.

With reference to FIG. 6, the advantages of the present invention may be further appreciated, by considering resources expended versus bandwidth. On the x-axis, number of web mining applications (WMAs) is plotted. On the y-axis, resource usage in bandwidth is plotted. For a conventional polling model (-■-) an increase in the number of WMAs results in a directly proportional increase in the bandwidth. For a HyperDog model (-x-) which is an example according to the invention, there is no difference in the bandwidth regardless of the addition of WMAs, i.e., increasing the number of WMAs does not increase the bandwidth needed.

It will be appreciated as set forth above, particularly with regard to the figures but without limitation thereto, that the invention results in the location of much new information on the network. In a further aspect, the invention provides ways to process the new information, such as to assign weight or importance. New information that is found receives a measurement of weight partially based on the weight of "nearby documents". The definition of "nearby document" is based on the URL (Universal Resource Locator) structure of the information. To further enhance this weighting process, a time dependent function can be applied to this weight. Thus, as the content ages, its portion of weight gained from the documents around it will decrease with time.

Together, aspects of the invention are combined to provide a system that gathers more information than previous systems, continually provides access and notification of fresh information, and is able to rate the importance or relevance of this fresh information.

Another aspect of the present invention is ranking of new or changed content. Namely, once new content is found, it must be ranked on its importance or relevance. This ranking is mainly useful for search engines, but has other uses as well.

To accomplish this relevance rating, the page having new content is partially ranked on the authoritativeness of its neighboring pages. The measure of "neighboring" is based on the URL structure of the pages. For a new page X with a URL of http://www.xyz.edu/a/b/c/d/X.html, its weight will have a component that is based on the weight of pages in the same "/a/b/c/d" directory, where those neighboring, existing pages already have associated with them an Authority$_{13}$ Measure conventionally derived.

The neighboring page-based ranking component, newly introduced by the invention and for applying to a page on a network such as the Internet with new content, is called the Temporary$_{13}$ Authority$_{13}$ Measure (TAM). For example if there were two pages in the "/a/b/c/d/" directory, X.html and Q.html, and Q had a Authority$_{13}$ Measure of 100, then X would have a TAM of 80.

If Q was not in the "/a/b/c/d/" directory, but was in the "a/b/c/" or "a/b/c/d/e/" directory then Q would have a TAM of 20.

As the distance in directory structure decreases, so does the contributing weight.

The general formula or table of formulae for such a TAM boost is customizable to the search engine. For example, different search engines may give different TAMs, or they could have the same TAM measurement but weight the TAM into their overall Authority Measurement differently.

Thus, an initial TAM for a new page Q can be assigned based on a nearby page X already having an Authority$_{13}$ Measure as set forth above.

Figure 8A:
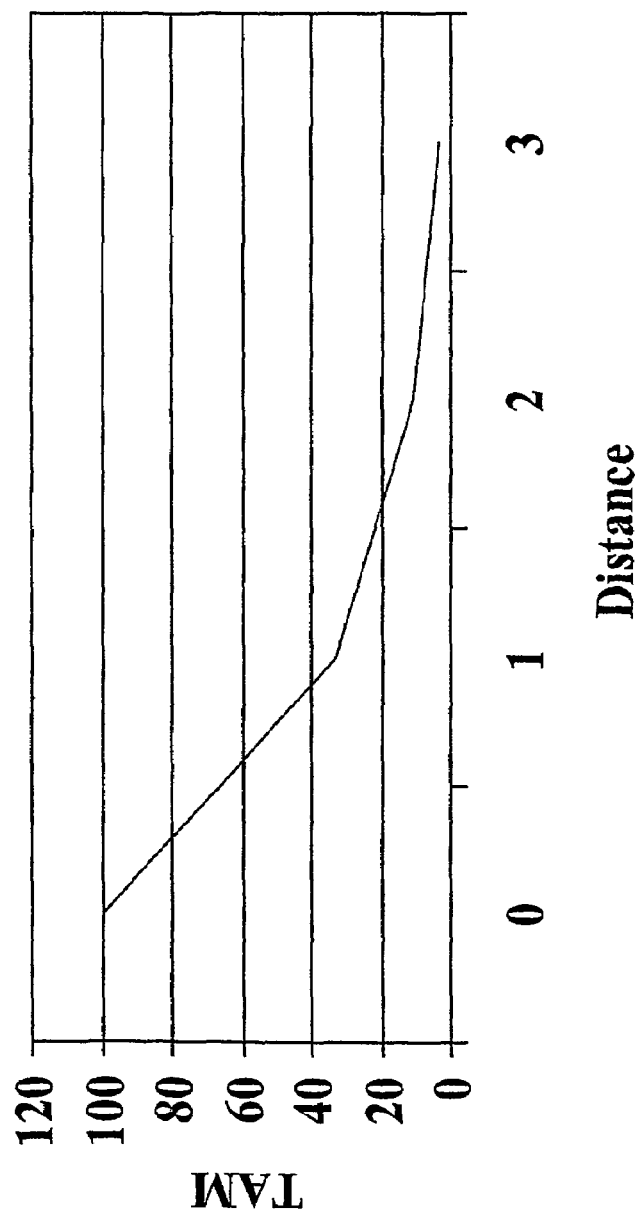
FIGS. 8A and 8B are graphs of a temporary authority measure (TAM) according to the invention.

With reference to FIG. 8A, an example of TAM as a function of distance for a TAM according to the invention may be seen. In FIG. 8A TAM is plotted on the y-axis versus distance on the x axis, with time held constant. The curve in FIG. 8A is an example, and other curves may be used. The new document which was used to prepare FIG. 8A may be http://www.abc.com/dog/cat/mouse/squirrel/pet.html. Examples of distance measures from the new document are as follows:

D=1: http://www.abc.com/dog/cat/mouse/squirrel/apple.html
D=2: http://www.abc.com/dog/cat/mouse/orange.html
D=3: http://www.abc.com/dog/cat/pear.htnl
D=3 http://www.abc.com/dog/cat/mouse/wombat/a.html
D=4: http://www.abc.com/dog/a.html
D=4: http://www.abc.com/dog/cat/class/us.html
D=5: http://www.abc.com
D=6: http://www.abc.com/hello Additionally, the invention provides for modifying the TAM measurement to reflect time. For example, if Q is new content assigned an initial TAM of 80 based on links around it, then as time passes, the TAM for Q gained from Q's neighbors will decrease. If Q.html is assigned a TAM of 80 when it is first found, then after a week the TAM will have dropped to 60, after another week, the TAM will be down to 40, after a month or more the TAM on Q is 0. This time-based adjustment ensures that TAM of the new content does not remain the dominating Authority$_{13}$ Measure forever, and a page eventually gains its Own Authority$_{13}$ Measure based on popularity.

Figure 8B:
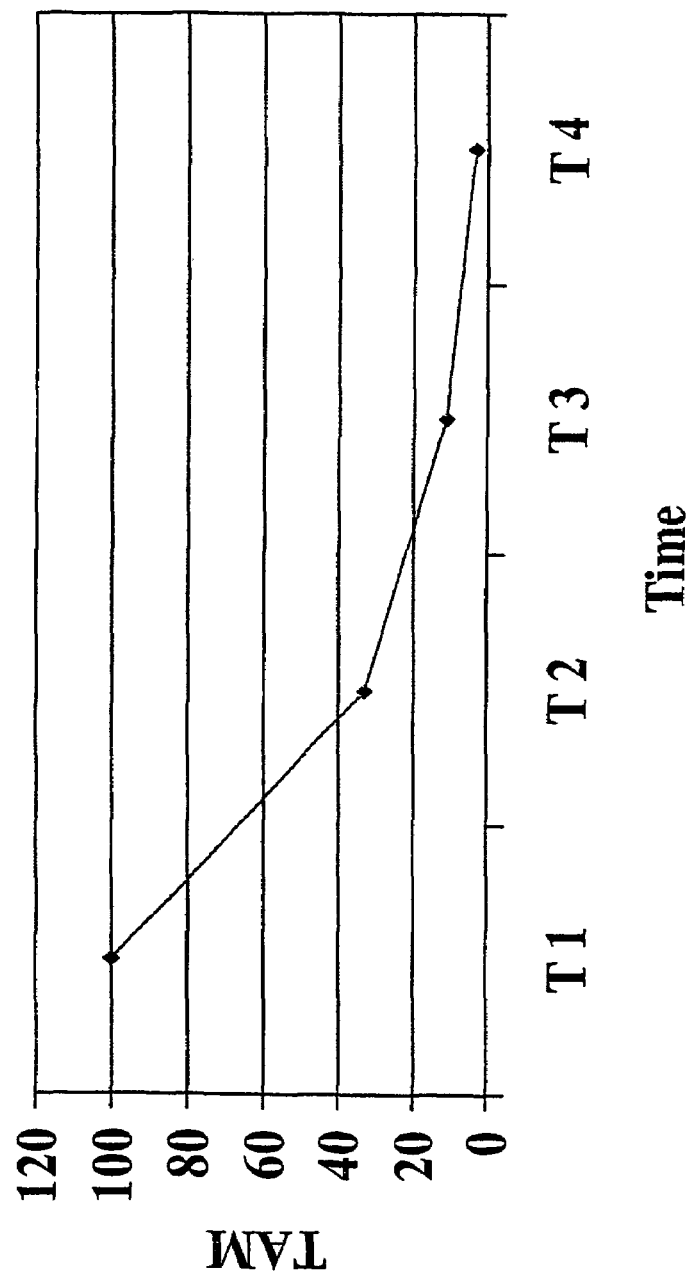

With reference to FIG. 8B, an example of time-decay of a TAM according to the invention may be seen. In FIG. 8B, TAM is plotted on the y-axis versus time on the x-axis, with distance held constant. The curve in FIG. 8B is an example, and other curves may be used.

The general formula or table of formula for the TAM time-decay feature is customizable to a particular search engine.

Those working with computer systems will appreciate, with reference to the above, that embodiments of the present invention may be constructed with the above information using, as necessary, conventionally available hardware and software, and programming techniques.

Although particular mention has been made above of search engine applications, it will be appreciated that the systems of the present invention are not limited to search engines, but may be used in any system that requires crawling or event notification on the state of information on a massive information network (of which the Internet is an important example). The invention provides systems that are commercially useable in many applications, including but not limited to: enhancing the performance of search engines; gathering information for data mining applications; and, to information-gathering for "Electronic Libraries".

While the invention has been described in terms of its preferred embodiments, those skilled in the art will recognize that the invention can be practiced with modification within the spirit and scope of the appended claims.

We claim:

1. A method for data delivery, comprising:
   (A) distributing a plurality of crawlers directed by at least one coordinating Link Server through low bandwidth commands, said plurality of crawlers being deployed on a plurality of contributor computers throughout a network;
   (B) sending at least two links to one of said plurality of crawlers instructed by the at least one coordinating Link Server to check the pages corresponding to the at least two links, wherein each link includes URL name, last time checked, and a last crawl date page digest;
   (C) connecting the instructed crawler to the first link of the at least two links and commanding the instructed crawler to read a header of the to-be-checked page corresponding to the first link, and
      (1) commanding the instructed crawler that if the to-be-checked page header returns a last modified date, the crawler check the last modified date against the last time checked,
         (i) if the to-be-checked page is found to be unchanged, the instructed crawler bypasses and does not process the to-be-checked page and proceeds to the second link;
         (ii) if the to-be-checked page is found to have changed since the last checked time, the instructed crawler sends the to-be-checked page to the at least one coordinating Link Server;
      (2) commanding the instructed crawler that if no last modification date is found in the to-be-checked page header, the instructed crawler downloads the to-be-checked page, and then runs the downloaded page through a function at the instructed crawler to obtain a new page digest for matching against the last crawl page digest,
         (i) if the new page digest is matched with the last crawl page digest, the crawler proceeds to the second link,
         (ii) if no match is found, the instructed crawler transmits the new page digest to the at least one coordinating Link Server with a crawl time for updating;
   (D) extracting content of the sent and downloaded to-be-checked page for inclusion in a stream of events, said content included in said stream of events being only new or changed pages; and
   (E) delivering the extracted content from the at least one coordinating Link Server to a plurality of web-mining applications via said stream of events, said plurality of web-mining applications being event driven by said stream.

2. The method of claim 1, wherein after the downloaded to-be-checked page is determined to be new or changed, the crawler optionally extracts links on the downloaded to-be-checked page and reports the extracted links to the at least one coordinating Link Server.

3. The method of claim 2, including identifying if extracted links are valid by commanding the instructed crawlers to attempt to connect to the extracted links from the downloaded to-be-checked page.

4. The method of claim 2, including commanding the instructed crawler, once connected, to also filter the links and only extract and return HTML/TEXT links.

5. The method of claim 2, including information processing by the crawlers on the downloaded pages.

6. The method of claim 5, wherein the information processing is selected from the group consisting of: stripping out HTML tags and using information retrieval and/or natural language processing techniques to characterize the downloaded to be checked page.

7. The method of claim 1, including updating Link Server records on the at least two links and scheduling them for later crawling or re-crawling.

8. The method of claim 7, including management by the at least one coordinating Link Server of link assignments for crawling.

9. The method of claim 8, wherein the management by the at least one coordinating Link Server comprises assigning network-wise close links to a crawler and/or arranging for relatively more frequent crawling of links from domains with track records of frequent change.

10. The method of claim 1, wherein the web mining application upon receiving the extracted content conducts at least one of the following: (a) storage of the new or changed pages, (b) storage of only delta changes of a page, (c) data mining; (d) data processing; (e) application of data to at least one search engine, (f) intelligent caching.

11. A computer storage medium including instructions for delivering an event stream of new or changed web pages on a network, said instructions being executed by one or more processors to perform the steps of:
   (A) distributing a plurality of crawlers directed by at least one coordinating Link Server through low bandwidth commands, said plurality of crawlers being deployed on a plurality of contributor computers throughout a network;
(B) sending at least two links to one of said plurality of crawlers instructed by the at least one coordinating Link Server to check the pages corresponding to the at least two links, wherein each link includes URL name, last time checked, and a last crawl date page digest;
(C) connecting the instructed crawler to the first link of the at least two links and commanding the instructed crawler to read a header of the to-be-checked page corresponding to the first link, and
   (1) commanding the instructed crawler that if the to-be-checked page header returns a last modified date, the crawler check the last modified date against the last time checked,
      (i) if the to-be-checked page is found to be unchanged, the instructed crawler bypasses and does not process the to-be-checked page and proceeds to the second link;
      (ii) if the to-be-checked page is found to have changed since the last checked time, the instructed crawler sends the to-be-checked page to the at least one coordinating Link Server;
   (2) commanding the instructed crawler that if no last modification date is found in the to-be-checked page header, the instructed crawler downloads the to-be-checked page, and then runs the downloaded page through a function at the instructed crawler to obtain a new page digest for matching against the last crawl page digest,
      (i) if the new page digest is matched with the last crawl page digest, the crawler proceeds to the second link
      (ii) if no match is found, the instructed crawler transmits the new page digest to the at least one coordinating Link Server with a crawl time for updating;
(D) extracting content of the sent and downloaded to-be-checked page for inclusion in said stream of events, said content included in said stream of events being only new or changed pages; and
(E) delivering the extracted content from the at least one coordinating Link Server to a plurality of web-mining applications via said stream of events, said plurality of web-mining applications being event driven by said stream.

12. A metacomputer system for making available to a web mining application freshly published content on a computer network, comprising:
a plurality of participating computers on the computer network, each said participating computer constituting a node of the metacomputer system; and
a distributed crawling system configured for:
(A) distributing a plurality of crawlers directed by at least one coordinating Link Server through low bandwidth commands, said plurality of crawlers being deployed on a plurality of contributor computers throughout a network;
(B) sending at least two links to one of said plurality of crawlers instructed by the at least one coordinating Link Server to check the pages corresponding to the at least two links, wherein each link includes URL name, last time checked, and a last crawl date page digest;
(C) connecting the instructed crawler to the first link of the at least two links and commanding the instructed crawler to read a header of the to-be-checked page corresponding to the first link, and
   (1) commanding the instructed crawler that if the to-be-checked page header returns a last modified date, the crawler check the last modified date against the last time checked,
      (i) if the to-be-checked page is found to be unchanged, the instructed crawler bypasses and does not process the to-be-checked page and proceeds to the second link;
      (ii) if the to-be-checked page is found to have changed since the last checked time, the instructed crawler sends the to-be-checked page to the at least one coordinating Link Server;
   (2) commanding the instructed crawler that if no last modification date is found in the to-be-checked page header, the instructed crawler downloads the to-be-checked page, and then runs the downloaded page through a function at the instructed crawler to obtain a new page digest for matching against the last crawl page digest,
      (i) if the new page digest is matched with the last crawl page digest, the crawler proceeds to the second link
      (ii) if no match is found, the instructed crawler transmits the new page digest to the at least one coordinating Link Server with a crawl time for updating;
(D) extracting content of the sent and downloaded to-be-checked page for inclusion in a stream of events, said content included in said stream of events being only new or changed pages; and
(E) delivering the extracted content from the at least one coordinating Link Server to a plurality of web-mining applications via said stream of events, said plurality of web-mining applications being event driven by said stream.

13. The metacomputer system of claim 12, wherein the plurality of participating computers on the computer network run a software application which constitutes a contributor environment (CE), the computer network further comprising an application server which deploys the plurality of web crawlers and coordinates the nodes of the metacomputer system by allocating jobs to the CE.

14. The metacomputer system of claim 12, wherein the computer network is the Internet or an intranet.

15. The metacomputer system of claim 14, wherein the plurality of web mining applications running on the network, and the extracted content encountered on the network being transmitted by the CE as a stream of events available to the plurality of web mining applications.

16. The metacomputer system of claim 12, wherein the at least one coordinating link server receives content from the web crawlers.

17. The metacomputer system of claim 16, wherein the instructed crawler is commanded by an allocation server (AS) to return only fresh encountered content to the at least one coordinating link server.

18. The metacomputer system of claim 12, wherein data of the extracted content is compressed before being transmitted.

19. The metacomputer system of claim 12, wherein the extracted content is rated before transmitting.

* * * * *